(12) United States Patent
Zannini

(10) Patent No.: US 6,220,384 B1
(45) Date of Patent: Apr. 24, 2001

(54) VEHICLE FOR HANDLING VARIOUS MATERIALS OR OPERATING UNITS IN SHEDS, AIRPORTS, AND MARKETS

(75) Inventor: Gianfranco Zannini, Limena (IT)

(73) Assignee: Techmo Car S.p.A., Limena PD (IT)

( * ) Notice: Subject to any disclaimer, the term of this patent is extended or adjusted under 35 U.S.C. 154(b) by 0 days.

(21) Appl. No.: 09/082,864

(22) Filed: May 21, 1998

(30) Foreign Application Priority Data

May 28, 1997 (IT) ............................... MI97A1251
Aug. 5, 1997 (IT) ............................... MI97A1877

(51) Int. Cl.[7] .................................................. B62D 33/06
(52) U.S. Cl. .......................................... 180/89.13; 280/98
(58) Field of Search ................................. 180/89.13, 252, 180/264, 199; 280/98; 296/190.01, 190.04, 190.05; 446/441, 442

(56) References Cited

U.S. PATENT DOCUMENTS

| | | | |
|---|---|---|---|
| 393,549 | * 11/1888 | Fallon | ...................... 280/98 |
| 1,637,456 | * 8/1927 | Reid | ........................................ 280/98 |
| 5,666,792 | * 9/1997 | Mullins | .............................. 56/10.2 A |

FOREIGN PATENT DOCUMENTS

| | | |
|---|---|---|
| 324 477 | 9/1918 | (DE) . |
| 577 300 | 11/1931 | (DE) . |
| 85902531 | 5/1985 | (EP) . |
| 409 688 | 4/1910 | (FR) . |
| 1 180 063 | 6/1959 | (FR) . |
| 1 181 629 | 6/1959 | (FR) . |
| 2 099 767 | 12/1982 | (GB) . |

* cited by examiner

Primary Examiner—Paul N. Dickson
Assistant Examiner—Faye M. Fleming
(74) Attorney, Agent, or Firm—Collard & Roe, P.C.

(57) ABSTRACT

Vehicle for handling various material such as nodes, ladles or operating units in rooms wherein a wide maneuver capacity is required in narrow spaces and/or in the presence of obstacles, impediments, such as industrial sheds, airports, areas for heavy means, and markets comprising a front driving and steering structure carrying a driver's cab, said structure being suitable to rotate continuously by 360° in both the clockwise and the anti-clockwise directions about its own vertical axis.

10 Claims, 4 Drawing Sheets

VEHICLE FOR HANDLING VARIOUS MATERIALS OR OPERATING UNITS IN SHEDS, AIRPORTS, AND MARKETS

BACKGROUND OF THE INVENTION

1. Field of the Invention

The present invention relates to a vehicle for the transportation and handling of various materials or operating units in rooms, which require a high mobility and wide maneuverability in narrow spaces and/or in the presence of obstacles, and impediments. In particular, these rooms are the insides of sheds, warehouses, deposits, airports, markets, deposit and/or maneuver areas for heavy means.

As is known, in industrial plants, warehouses, and deposits, it is necessary to handle various materials, that are often heavy and cumbersome due to their form and size. Often these materials must be handled in very narrow spaces or in the presence of obstacles and utilizing especially equipped self-propelled vehicles, which have to follow tortuous and obliged runs. For instance, in warehouses or deposits, it is necessary to arrange the various goods according to a pre-fixed order and to collect these goods when needed, by performing very precise maneuvers.

Instead, in other cases, it is necessary to transport operating units from one place to another place and to position them suitably and exactly, so then these units can perform their desired function.

2. Description of the Prior Art

For instance, it is known that in airports it is necessary to position near the departing aircraft an operating unit comprising the generator to start the engines. This operation requires a careful positioning maneuver which must take in due account the presence of the wings and the tail of the aircraft.

As is also known, in plants of the metallurgical, iron-metallurgical types, in foundries, it is necessary to handle various materials, often heavy and cumbersome due to the form and size, usually in very narrow spaces and utilizing suitably equipped self-propelling vehicles.

For instance, the plants for the electrolytic production of aluminum require the periodic replacement of anodes because of their wearing during the working in electrolysis cells. Both the worn anodes and the new ones are prepared by groups positioned on pallets, which are thereafter transported and handled by means of a particular type of self-propelling vehicle that can move in the inside of the plant, between the rows of electrolytic cells.

The present types of self-propelling vehicles are usually constituted by a tractor with two driving and steering wheels and by a trailer; the tractor is usually connected to the trailer through a vertical axis joint, suitable to allow the steering of the tractor with respect to the trailer according to an angle, relatively to the longitudinal axis of the vehicle, which is always very limited because of the presence of the front part of the trailer, which is very approached to the tractor.

SUMMARY OF THE INVENTION

An object of the present invention is to provide a vehicle for the transportation and handling of various materials or operating units, so designed and structured as to obviate the structural complexity, the maneuverability and/or visibility limitations due to the reduced steering angle of the present vehicles for the handling of materials or transportation of operating units in the inside of plants, sheds, markets, and airports, and to allow the realization of all the necessary maneuvers in perfect conditions of visibility by the operator.

A further object of the invention is to provide a vehicle suitable for handling any produce and/or operating and/or service equipment in areas wherein a high maneuver capacity is needed, together with a full visibility of the operations to be performed.

Another object of the invention is to provide a self-propelling vehicle of the type specified hereinabove, so structured as to have longitudinal dimensions markedly smaller than those of the known vehicles—the dimensions of the loading or transportation structure being the same—with obvious advantages concerning its movement possibilities in very narrow areas and/or areas having obstacles, and encumbrances.

Another object of the invention is to provide a self-propelling vehicle of high reliability and easily drivable both in a forwards and in a reverse motion. These and still other objects, which will be more clearly stressed hereinafter are achieved by providing a self-propelling vehicle for the transportation and handling of various materials or operating units in rooms wherein a wide maneuver capacity and the utmost visibility are required in narrow spaces and/or in the presence of various obstacles and/or impediments, of the type that comprises a trailer and a draft-tractor. This vehicle according to the present invention comprises:

a trailer comprising a structure suitable to contain said materials or the operating or service units to be handled, and a front part or extension, provided with a circular through-hole or seat, a driving and steering structure or tractor constituted by a revolving platform, a driver's cab, a driving and steering axle, provided with a couple of wheels integrally connected to the revolving platform by means of a tubular element freely rotatably housed in the circular through-hole or seat, means for connecting the driving and steering structure and said front part of the trailer, suitable to allow the free endless rotation both in the clockwise and the anti-clockwise direction of the driving and steering structure relatively to said front part of the trailer, driving means suitable to ensure the movement of the vehicle as well as the rotation of said driving and steering structure, so as to allow the operator to perform the translation of the vehicle and the rotation of said driving and steering structure from one only driving place.

More particularly, this means connecting this driving and steering structure and this front part are constituted by a fifth wheel having the lower part strongly connected to the driving and steering axle, and the upper part rigidly keyed on the lower plane of the front part of the trailer.

Besides, the driving means are associated to the platform or the axle, or else they can be associated to the trailer and transmit the motion to the axle by means of suitable hydraulic, pneumatic means passing through suitable uprights and tie-rods.

The operating part of the vehicle according to the invention is equipped with its own axle having two or more wheels.

The chassis of the vehicle portion contains a front part (extension), on whose lower surface a fifth wheel, revolving element, is installed, which is controlled by a special actuator and allows the rotation of the elements connected to it. More in detail, in the lower part of the fifth wheel, a driving axle is fastened, provided, as usual, with own engines, reducers, wheels and whatever else is necessary for the driving of a vehicle. By means of a tubular element that goes through the central hollow zone of the fifth wheel and the supporting front part of the trailer, as stated hereinabove, the driving axle rigidly supports a platform which, in this way, lies above the front part or extension and can freely rotate together with the driving structure.

The platform houses both the operator's cap (complete with seat, console, controls, pedals, accessories and whatever else is usually applicable), and the engine (which based on need may be either electrical or endothermic) may be installed, preferably, on the other side of the platform, together with all the necessary accessories such as tanks, pumps or other ones.

According to another embodiment of the present invention, this revolving platform contains a first transmission element integral with the tubular element, connected through suitable kinematic means, to a second transmission element suitable to rotate about its own vertical axis parallel to the rotation axis of the tubular element off-centered relative to the latter and supporting the driver's cab.

In this way, the driver's cab may be positioned, always associated to the driving and steering structure, but off-centered relative to the rotation axis of the same structure, so as to satisfy, for instance, particular visibility requirements or for the purposes of a more effective management of particular operation units.

The transmission elements may contain pulleys connected to one another by a belt, a chain, or may contain gearwheels or other equivalent transmission kinematic means, suitable to cause the rotation of the driver's cab synchronously with the rotation of the driving and steering axle.

The electric or hydraulic feeding of the operating devices located in the control part do not need any particular connections. This is because these control parts rotate integrally with the engine, while the devices located in the operating part of the vehicle are fed by drawing the energy source from the rotation axis of the control module. For example this feeding can occur by connecting the mobile half-part of a common rotating joint to the revolving platform and by installing the fixed half-part of the joint on a portal-frame connected to the operating part of the vehicle. The width and the height of said portal are designed to allow the rotation of the revolving platform and the structures connected to the same without any interference.

According to another embodiment of the invention, the transmission of at least a part of the controls, in particular the electric ones, from the control part to the operating part, is obtained by means of radio signals.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar reference characters denote similar elements throughout the several views.

DETAILED DESCRIPTION OF THE PREFERRED EMBODIMENT

Figure 1:
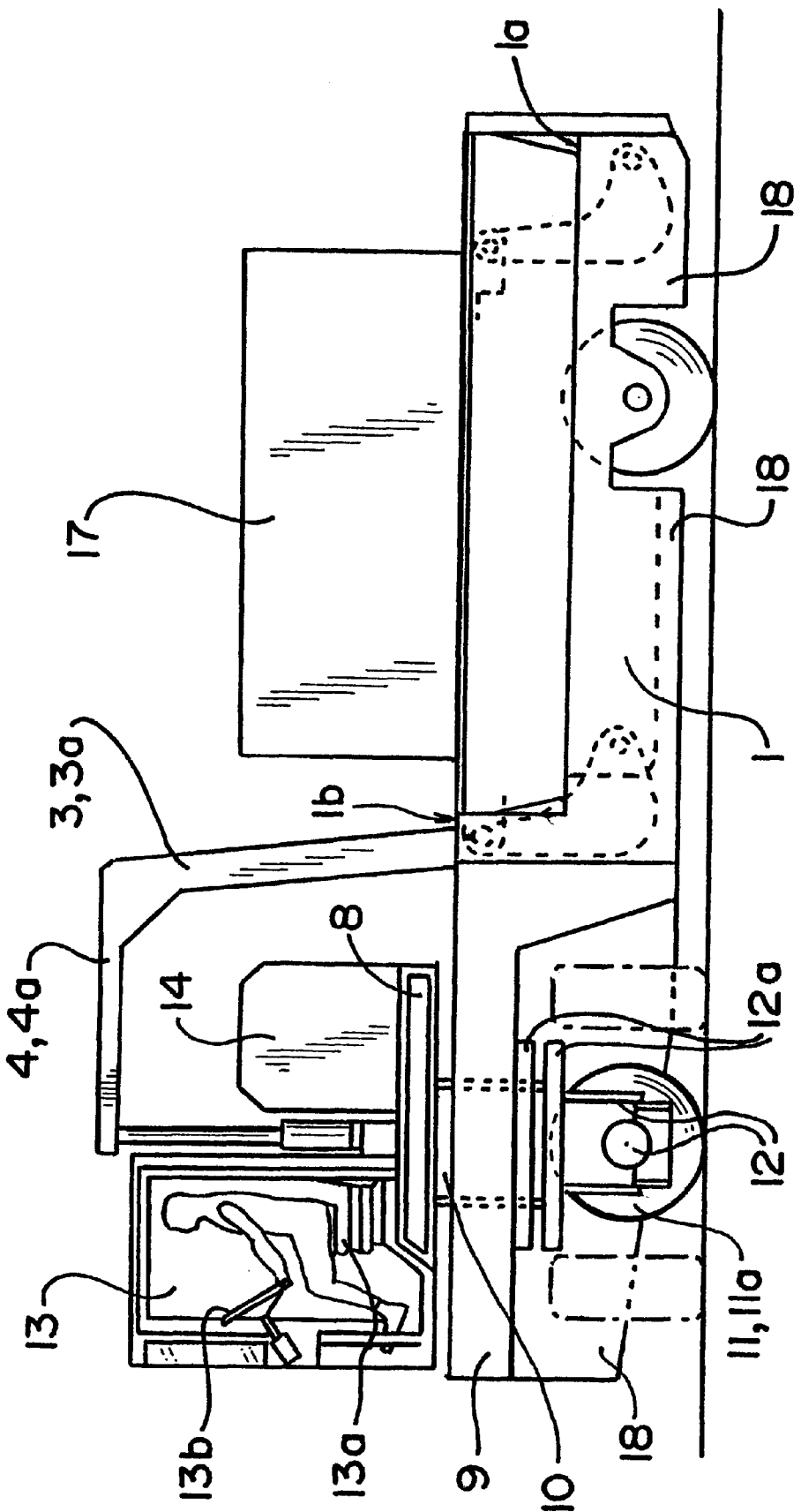
FIG. 1 shows schematically a side view the self-propelling vehicle, realized according to the invention.
Figure 2:
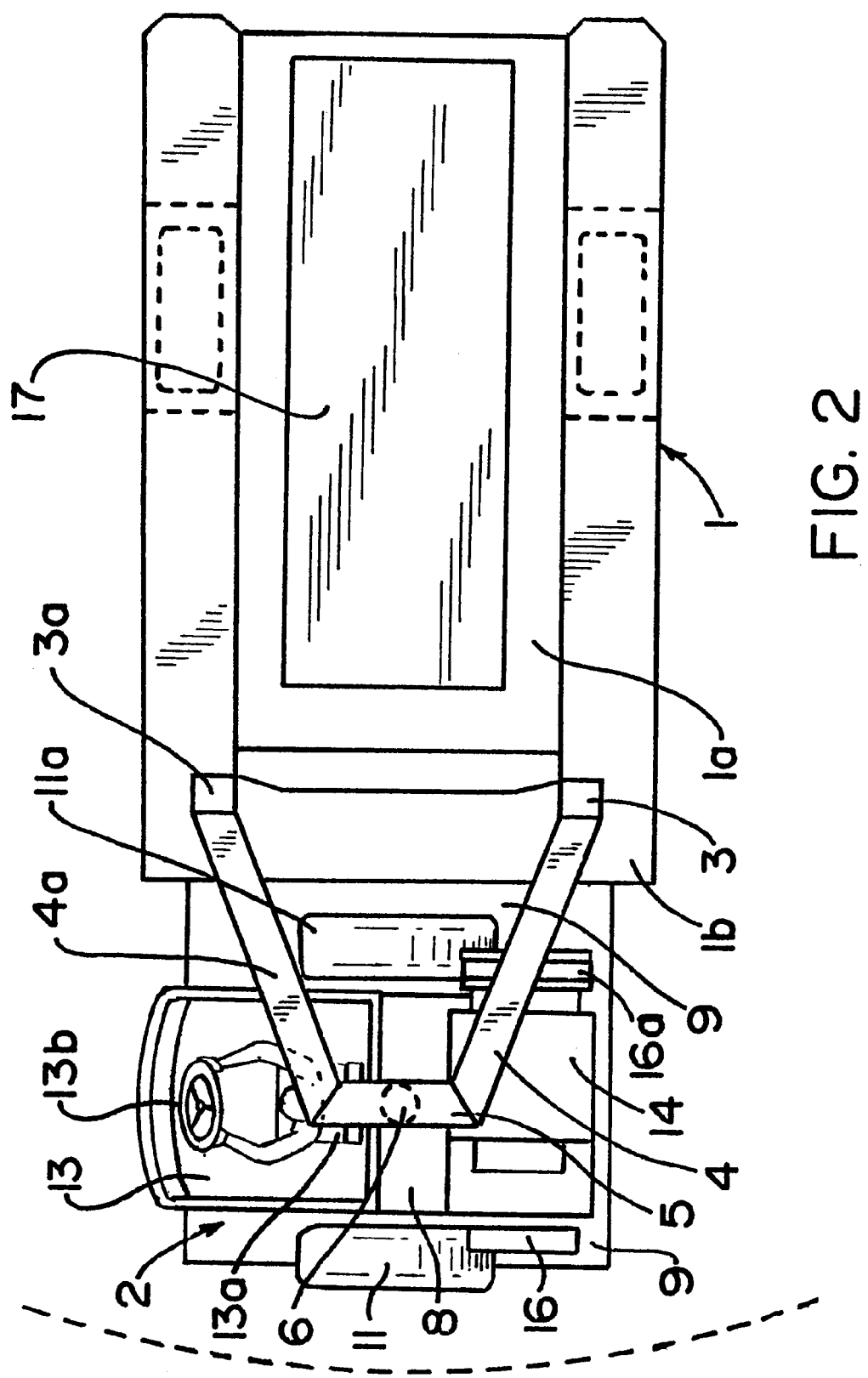
FIG. 2 shows, always schematically, a top view of the vehicle of FIG. 1.

Referring in detail to the drawings, FIGS. 1 and 2 show a side view and a top view of the self-propelling vehicle for the transportation and handling of various materials and operating units in the inside of sheds, warehouses, airports, and markets, and anywhere a high maneuver capacity is required in narrow spaces and in the presence of obstacles and/or various impediments, is substantially constituted by a driving unit, comprising a trailer 1 and a two-wheeled tractor 2.

The front part 9 of the trailer (FIG. 1) has a circular hole, extending through by the tubular element 10 integral in the upper part with platform 8 and in the lower part with the driving and steering axle 12. The axle forms a whole with the lower part of the fifth wheel 12a, while the upper part of the fifth wheel is rigidly keyed on the lower plane of the front part 9 of trailer 1.

The axle, to which wheels 11–11a are rigidly connected, is also provided with its own engines, reducers and whatever else is necessary to allow both the translation of the vehicle and the rotation of said wheels about the axis of the tubular element, in order to allow steering.

To ensure the presence of the necessary hydraulic and electrical controls to the activation systems housed in the trailer, a bridge-like structure is anchored to the front part of the trailer. This bridge-like structure contains uprights 3–3a, inclined towards the median longitudinal axis of the trailer, and is integrated with the top two tie-rods 4–4a, to form a whole body arranged substantially in a horizontal position and united to each other by a further tie-rod 5. This tie rod is cantilever-supported by the bridge containing uprights 3–3a and tie-rods 4–4a.

Figure 3:
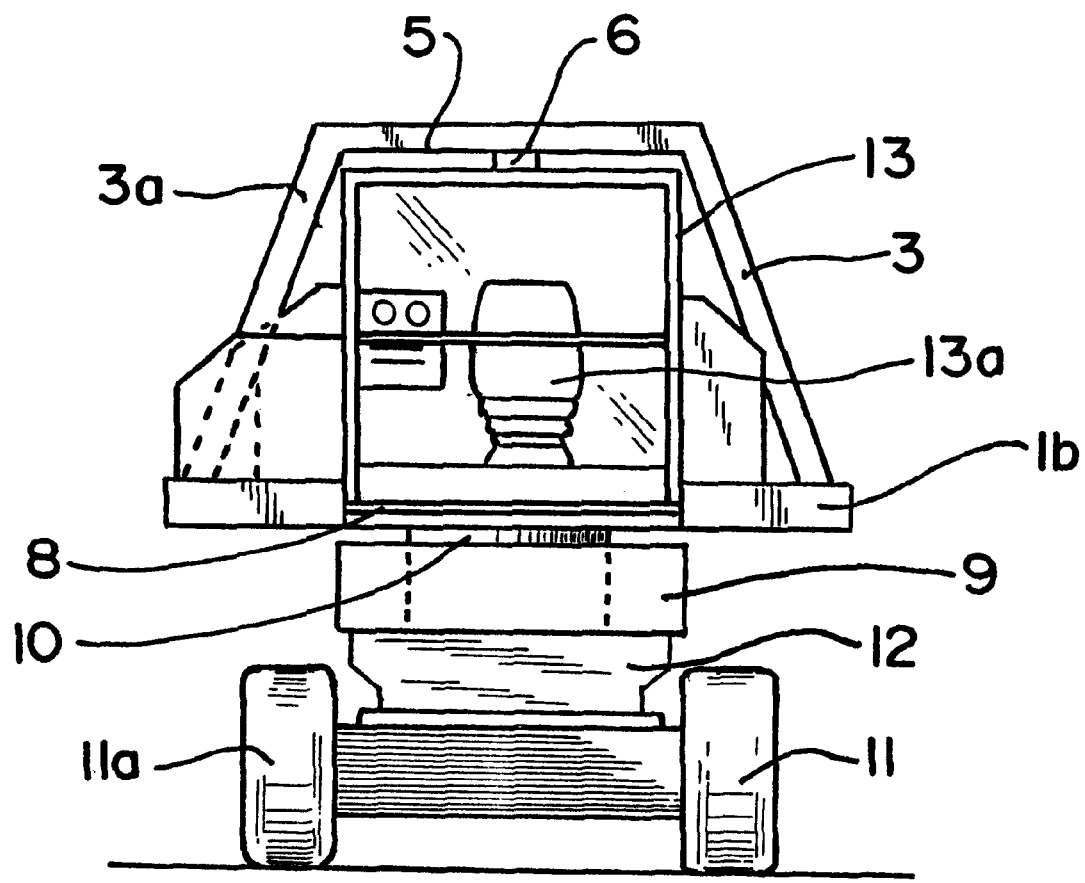
FIG. 3 shows a front view of the same vehicle of FIG. 1.

On the median line of tie-rod 5 is cylindrical shaft 6 extending along a vertical axis. Cylindrical shaft 6 is rigidly keyed to tie-rod 5 (See FIGS. 1 and 3), wherein a lower end of shaft 6 is fitted in a bush or sleeve freely rotatable, without translation, around the same shaft. The bush is then connected to platform 8, which is therefore free to rotate about the vertical axis cylindrical shaft 6.

Revolving platform 8 also connects to a driver's cab 13 (with seat 13a, steering wheel 13b and control dashboard) and a direct current driving means 14 of a known type electrically operated and the related diesel or gasoline accumulator.

As the supports of the front wheels 11–11a are rigidly coupled to the revolving platform, the motion transmission by engine 14 to the wheels may be obtained by known means, such as gears, for instance by means of gearwheels or pulleys, as schematically shown in FIG. 2 and indicated by 16–16a.

Lastly, in the figures there are a series of products 17 loaded on pallet 1a (for instance, anodes for electrolysis cells for the production of primary aluminum) or the operating units (for instance, the generator in case of an airport service vehicles), and by 18 is a sheet apron for the trailer and the front part.

Figure 4:
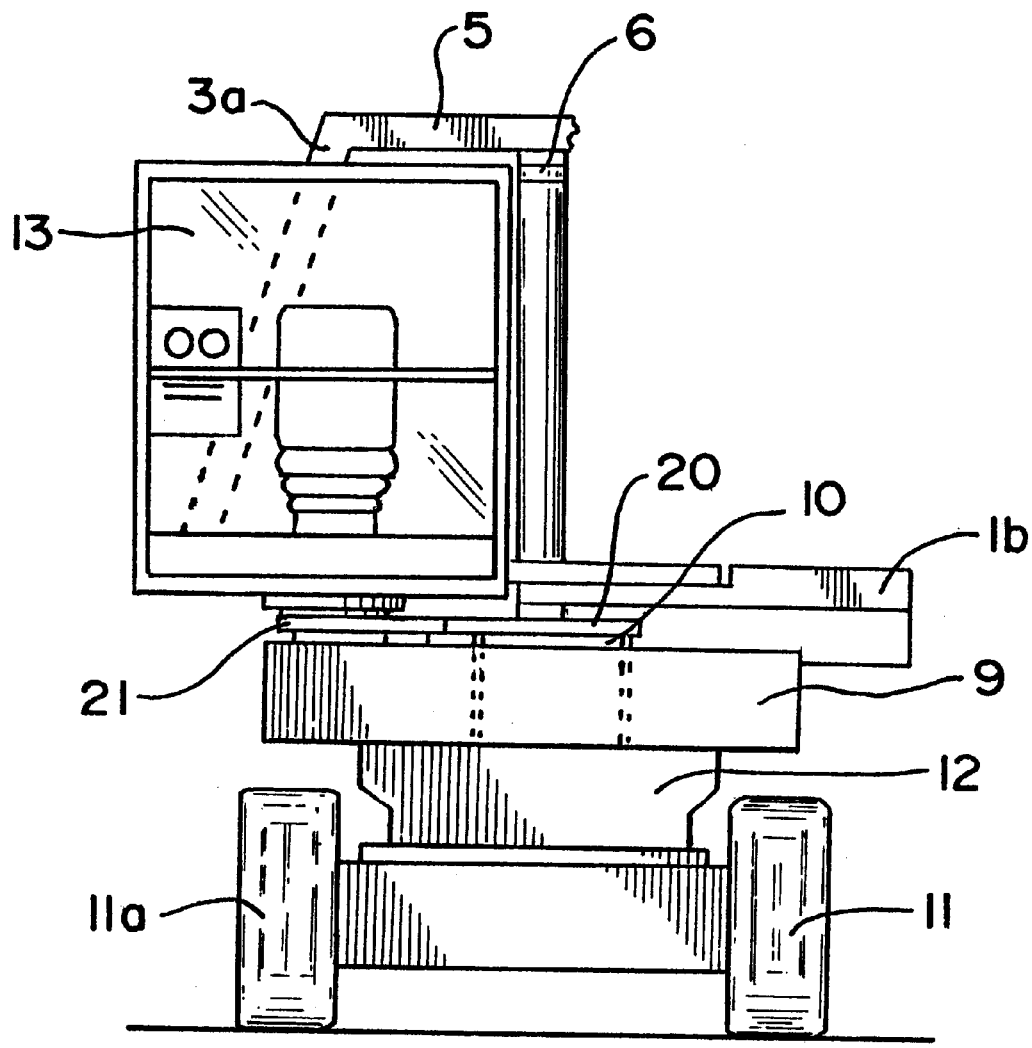
FIG. 4 shows, in front view, the self-propelling vehicle according to an alternative embodiment of the invention.

According to the embodiment of FIG. 4, the driver's cab 13 is off-centered relative to the rotation axis of the driving and steering axle 12; a first transmission element, generically indicated by 20, rotating integrally with the axle 12, causes the driver's cab 13 to rotate synchronously with the axle by means of the second transmission element generically indicated by 21 and rotating integrally with the driver's cab, by means of a belt or chain or by an equivalent suitable gear system.

As stated and as illustrated in the figures, it clearly appears that the presence of a driving and steering structure provides a four wheeled, front wheel drive vehicle. . The steering structure connects the trailer to the driver's cab with the related engine and allows the rotation of the cab. In addition, the steering structure allows the operator to pass from a forward (FIGS. 1 and 4) to a reverse motion by activating the suitable devices located in the inside of the one driving place (power steering). In addition, to perform the reverse motion, the whole cab rotates by 180° about its vertical axis, to obtain a correct and complete view of the maneuver to be performed, relative to the different functions of the operating units. These functions could be the approach to shelvings or pits to load and unload materials, or positioning a generator near an aircraft. The rotation of the cab may be continuous either in one direction or in an opposite direction, according to the maneuver requirements, and may be also carried out for a whole turn angle or more.

The vehicle described hereinabove also provides the advantage of a marked shortening of the same vehicle compared with the known vehicles for the same uses. In addition, the vehicle allows a drastic improvement of maneuver capacity (reduction in steering radius), a better drivability ensuing from cab's moving synchronously with the driving and steering axle, whereby the operator has the maximum visibility both in the forwards and the reverse motion, as well as when maneuvering.

The absence of any constraint relative to the angle between the driving unit and the vehicle allows an unlimited width for the angle.

It is clear that the vehicle according to the invention may be utilized to perform all the operations required in metallurgical plants, besides those necessary for the transportation and handling of anodes and ladles, by simply using a trailer type provided with a suitable containment and support structure.

For instance, for the transportation and handling of ladles, a trailer may be provided with a bridge-structure, such as, for instance, the one described in European Patent No. 0211846 by the same applicant, or equivalent bridge-structures.

Accordingly, while several embodiments of the present invention have been shown and described, it is to be understood that many changes and modifications may be made thereunto without departing from the spirit and scope of the invention as defined in the appended claims.

What is claimed is:

1. A self-propelling vehicle for the transportation and handling of various materials and products or operating and service units in rooms which require a wide maneuverability and visibility in a narrow space or in the presence of various obstacles and impediments, wherein the vehicle comprises:
   a) a trailer;
   b) a front part on said trailer having a circular through-hole or seat;
   c) a driving and steering structure coupled to said trailer comprising:
      i) a revolving platform that is rotatable about its own vertical axis up to 360 degrees and beyond with respect to said trailer both in a clockwise and in a counter clockwise direction;
      ii) a driver's cab coupled to said revolving platform;
      iii) a driving and steering axle rotatably mounted on said front part of said trailer;
      iv) a series of wheels disposed on said driving and steering axle;
      v) a tubular element freely rotatably housed in said circular through-hole or seat, integrally connecting said revolving platform to said series of wheels;
   d) means for connecting said driving and steering structure and said front part of said trailer, suitable to allow a free endless rotation both in a clockwise and in a counter-clockwise direction of said driving and steering structure relative to said front part of said trailer;
   e) a driving means suitable to ensure a movement of the vehicle as well as a rotation of said driving and steering structure, to allow an operator to perform the translation of the vehicle and the rotation of said driving and steering structure from only one driving place.

2. The vehicle according to claim 1, wherein said driver's cab is positioned on said revolving platform and rotates integrally with said platform.

3. The vehicle according to claim 1, wherein said revolving platform comprises a first transmission element integral with said tubular element connected through suitable kinematic means, to a second transmission element suitable to rotate about its own vertical axis parallel to the rotation axis of said tubular element off centered relative to said tubular element and supporting said driver's cab.

4. The vehicle according to claim 3, wherein said transmission elements and said kinematic means comprise a series of pulleys connected to each other by a belt, a chain, or by gear wheels or other equivalent kinematic means, suitable to cause said driver's cab to rotate synchronously with a rotation of said driving and steering axle.

5. The vehicle according to claim 1, wherein said connection means between said driving and steering structure and said front part of said trailer also contain a fifth wheel having a lower part integrally connected to said driving and steering axle and an upper part rigidly keyed on a lower plane of said front part.

6. The vehicle according to claim 1, wherein said driving means is coupled to said platform and said axle and also with said trailer, wherein said driving means transmits a motion to said axle by means of a hydraulic or pneumatic means passing through a series of uprights and tie-rods.

7. The vehicle according to claim 1, further comprising a series of controls, including a series of electrical controls designed to receive instructions from a series of radio waves.

8. The vehicle according to claim 1, wherein the vehicle is used for the handling and the positioning of operating service units.

9. The vehicle according to claim 1, wherein the vehicle is used for the transportation and handling of anodes in plants for the production of primary aluminum.

10. The vehicle according to claim 1, wherein the vehicle is used for the transportation and handling of ladles, by employing a trailer provided with a bridge structure.

* * * * *